US012020553B2

(12) United States Patent
Faizan et al.

(10) Patent No.: US 12,020,553 B2
(45) Date of Patent: Jun. 25, 2024

(54) IoT BASED MANAGEMENT SYSTEM AND A METHOD FOR ASSISTING USERS AROUND A SWIMMING POOL

(71) Applicant: Mirza Faizan, Irving, TX (US)

(72) Inventors: Mirza Faizan, Irving, TX (US); Mohammed Abdussamad Zaki, Edison, NJ (US); Safiyah Fatima, Edison, NJ (US); Afreen Fatima, Edison, NJ (US); Afrin Shaikh, Edison, NJ (US); Kemery Oparah, Clinton, MD (US); Maazin Saif, Durham, NC (US); Mirza Rizwan, Patna (IN); Amreen Syed, Edison, NJ (US); Hadiya Sameen, Mount Sinai, NY (US); Aayan Chowdhury, Edison, NJ (US); Abdul Basit Piracha, Euless, TX (US); Mishaal Qureshi, Frisco, TX (US); Abdullah Hasani, Murphy, TX (US); Zaynab Khan, Murphy, TX (US); Mariam Mir, Luton (GB); Muhummed Mir, Luton (GB)

( * ) Notice: Subject to any disclaimer, the term of this patent is extended or adjusted under 35 U.S.C. 154(b) by 121 days.

(21) Appl. No.: 17/940,060

(22) Filed: Sep. 8, 2022

(65) Prior Publication Data

US 2024/0087440 A1 Mar. 14, 2024

(51) Int. Cl.
*G08B 21/08* (2006.01)

(52) U.S. Cl.
CPC ......... *G08B 21/088* (2013.01); *G08B 21/084* (2013.01)

(58) Field of Classification Search
CPC .................................................... G08B 21/088
See application file for complete search history.

(56) References Cited

U.S. PATENT DOCUMENTS

| | | | | |
|---|---|---|---|---|
| 2017/0124841 | A1* | 5/2017 | Snyder | G08B 21/088 |
| 2018/0040223 | A1* | 2/2018 | Bodi | G08B 21/18 |
| 2019/0314243 | A1* | 10/2019 | MacCallum | H04L 12/2816 |
| 2020/0020221 | A1* | 1/2020 | Cutler | G08B 21/088 |
| 2022/0036717 | A1* | 2/2022 | Lovett | G06F 1/163 |
| 2022/0215736 | A1* | 7/2022 | Pinchasov | A61B 5/6823 |

* cited by examiner

*Primary Examiner* — Joseph H Feild
*Assistant Examiner* — Pameshanand Mahase

(57) ABSTRACT

The present disclosure envisages an IOT based management system for assisting users around a swimming pool. The system comprises a plurality of sensors configured to sense a plurality of parameters corresponding to various pre-defined events associated with said swimming pool; a control unit communicatively coupled to said plurality of sensors through a communication network to receive said plurality of parameters and configured to process said plurality of parameters based on at least one machine learning algorithm to generate actionable intelligence in the form of signals associated with said pre-defined events corresponding to said plurality of parameters; and at least one IOT based actuating mechanism configured to receive said signals and perform at least one action upon reception of said signals.

9 Claims, 3 Drawing Sheets

IoT BASED MANAGEMENT SYSTEM AND A METHOD FOR ASSISTING USERS AROUND A SWIMMING POOL

FIELD

The present disclosure relates to the field of devices for assisting users. More specifically, the invention belongs to the field of devices that assists a user around a swimming pool.

BACKGROUND

Safety around the swimming pool area is a major concern for parents and other people. Safety nets and rope are opted usually to protect people from drowning and maintain balance in the water of the swimming pool.

Other safety mechanisms around the swimming pool are hydraulic and mechanical means to raise the bottom of the swimming pool during a potential drowning emergency. However, a mandatory requirement for performing this task is the sturdiness of the bottom. These mechanisms also require continuous power sources making the whole proposition expensive.

Conventional systems also relied on a submerged inflatable bladder and a storage tank filled with compressed air to quickly inflate the bladder thereby lifting the submerged safety net during an emergency. While such systems fail to act quickly in case of an emergency. Moreover, the reliability of rubber-like inflatable bladders over long dormant periods is questionable.

Further, conventional art does not focus on other emergency requirements around the swimming pool, like calling an ambulance or police. There are other emergency requirements apart from drowning that are not defined in the conventional art.

There is, therefore, felt a need for a system and a method for assisting users around a swimming pool.

Objects

Some of the objects of the present disclosure, which at least one embodiment herein satisfies, are as follows:

An object of the present disclosure is to provide a system and a method a system and a method for assisting users around a swimming pool.

Another object of the present disclosure is to provide a system and a method that assists users in all emergency situations including drowning in a swimming pool.

Still another object of the present disclosure is to provide a system and a method for assisting users with reliable means for protecting the user.

Yet another object of the present disclosure is to provide a system and a method that does not require a continuous power supply for functioning.

A further object of the present disclosure is to provide a system and a method that is cheap to install/implement.

A still further object of the present disclosure is to provide a system and a method for assisting users that is accurate.

An object of the present disclosure is to provide a system and a method for assisting users that are capable of defining various emergency activities.

Another object of the present disclosure is to provide a system and a method for assisting users that is easy to use.

A further object of the present disclosure is to provide a system and a method for assisting users that is economical.

A still further object of the present disclosure is to provide a system and a method that employs machine learning for accuracy.

A yet another object of the present disclosure is to provide a system and a method that is the Internet of things based.

Other objects and advantages of the present disclosure will be more apparent from the following description, which is not intended to limit the scope of the present disclosure.

SUMMARY

The present invention envisages a management system for assisting users around a swimming pool.

The management system comprises a plurality of sensors, distributed in a pre-defined area around the swimming pool. The plurality of sensors is configured to sense a plurality of parameters corresponding to various pre-defined events associated with the swimming pool.

The management system includes a control unit communicatively coupled to the plurality of sensors through a communication network to receive the plurality of parameters. The control unit is configured to process the plurality of parameters to generate signals associated with the predefined events corresponding to the plurality of parameters.

The system also includes at least one IoT-based actuating mechanism configured to receive the signals and perform at least one action upon reception of the signals.

In an embodiment, the control unit includes a receiving module configured to receive the plurality of parameters from the plurality of sensors. It further includes an analysis module configured to analyze the plurality of parameters by employing at least one machine learning technique to generate signals associated with the pre-defined events.

The control unit further comprises a flagging module configured to flag an emergency event based on a comparison of the analyzed signals with a pre-defined threshold.

The control unit comprises an alarm generating module configured to receive the flagged event and further configured to generate an alarm in the case said analyzed data falls below a pre-defined threshold.

In another embodiment, the plurality of parameters includes the level of water relative to the base of the swimming pool, presence of user below the level of water, a position and a height of a person relative to the swimming pool, time a user remains below water, the temperature of the water and a combination thereof.

In yet another embodiment, at least one IoT based actuating mechanism in case of the flagged event is configured to determine the location of the user, deliver a ring buoy to the user, deliver an oxygen mask to the user experiencing breathing issues, uplifting a lower surface of the swimming pool, and transmitting a message to an expert.

In a further embodiment, the flagging module is configured to detect a drowning event based on a comparison of the detected height of the user to the water level of the swimming pool and on a time track of the user below a pre-defined water level.

In a still further embodiment, at least one IoT-based actuating mechanism includes a lifting mechanism configured to lift up and down a base of the swimming pool by a rack and pinion mechanism.

In an embodiment, the base is comprised of a fiberglass mesh.

In another embodiment, the alarm generating module is configured to transmit a distress message to local police and ambulance.

A management method for assisting users around a swimming pool, the management system comprising:

sensing, by a plurality of sensors, a plurality of parameters corresponding to various pre-defined events associated with the swimming pool;

receiving, by a control unit, the plurality of parameters;

processing, by the control unit, the plurality of parameters to generate signals associated with the pre-defined events corresponding to the plurality of parameters; and performing, by at least one IoT-based actuating mechanism, at least one action upon reception of the signals.

In an embodiment, the processing further includes:

receiving, by a receiving module, the plurality of parameters from the plurality of sensors;

analysing, by an analysis module, the plurality of parameters by employing at least one machine learning technique to generate signals associated with the predefined events;

flagging, by a flagging module, an emergency event based on a comparison of the analysed signals with a predefined threshold; and generating, by an alarm generating module, an alarm corresponding to the flagged event in case the analysed data falls below a predefined threshold.

These and other features, advantages, and objects of the various embodiments will be better understood with reference to the following drawings, specifications and claims.

BRIEF DESCRIPTION OF THE ACCOMPANYING DRAWING

The accompanying drawings, which are included to provide a further understanding of the invention and are incorporated in and constitute a part of this specification, illustrate embodiments of the invention and together with the description serve to explain the principles of the invention.

Further, the accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears.

The same numbers are used throughout the figures to reference features and components. Some embodiments of system and/or methods in accordance with embodiments of the present subject matter are now described, by way of example only, and with reference to the accompanying figures, in which:

Features, elements, and aspects of the invention that are referenced by the same numerals in different figures represent the same, equivalent, or similar features, elements, or aspects in accordance with one or more embodiments.

The following figure depicts a certain illustrative embodiment of the invention. This depicted embodiment is to be understood as illustrative of the invention and not as limiting in any way.

Referring particularly to the drawing for the purpose of illustration only and not limitation, there is illustrated:

An IOT based management system and method for assisting users around a swimming pool are now described in accordance with a preferred embodiment of the present disclosure, in which.

LIST OF REFERENCE NUMERALS

Figure 1:
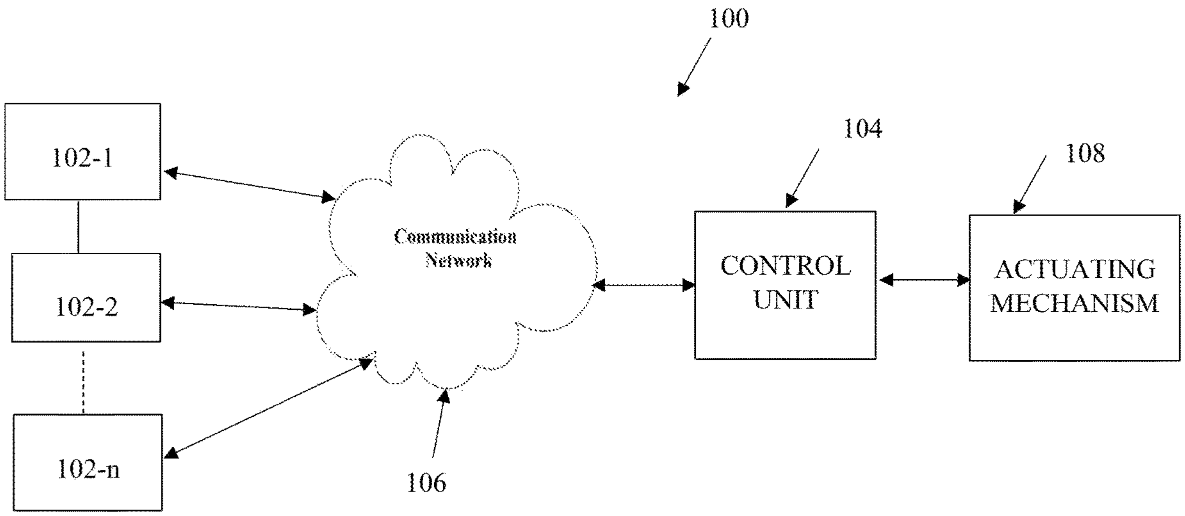
FIG. 1 illustrates an exemplary network environment for assisting users around a swimming pool, in accordance with an embodiment of the present disclosure.

100—System
102—Plurality of sensors
104—Control unit
106—Communication network
108—Actuating mechanism
110—Processor
112—Interface
114—Memory
202—Receiving module
204—Analysis module
206—Flagging module
208—Alarm generating module
210—Configuration data
212—Device & application data
214—User related data
216—Other data

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

The following detailed description illustrates the invention by way of example, and not by way of limitation. This description will clearly enable one skilled in the art to make and use the invention, and describes several embodiments, adaptions, variations, alternatives and uses of the invention, including what we presently believe is the best mode of carrying out the invention.

Figure 2:
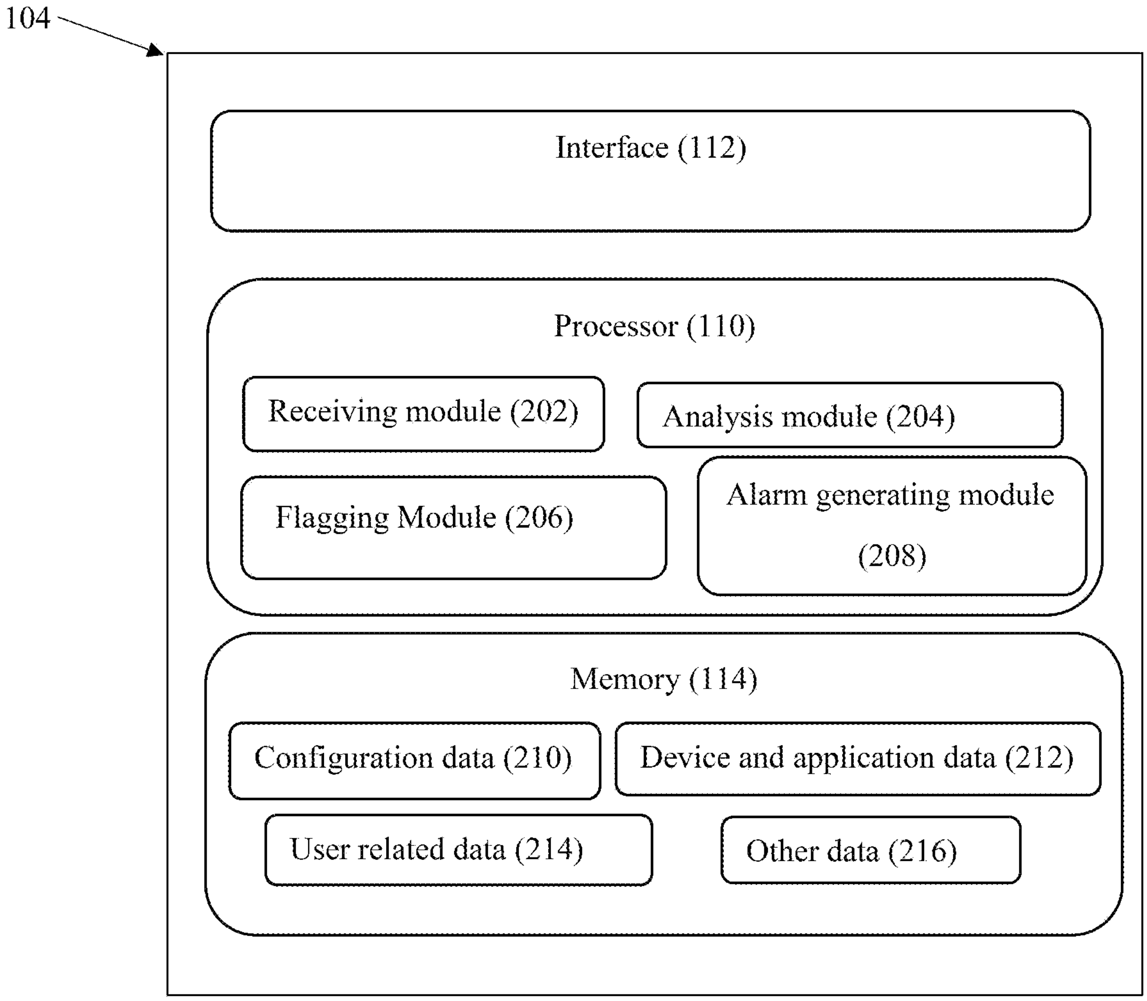
FIG. 2 illustrates an exemplary functional block diagram of the control unit of FIG. 1.

The present invention envisages a system and a method for assisting users around a swimming pool. The present invention will now be described with reference to FIGS. 1 and 2 of the preferred embodiments of the present invention.

The present invention envisages an IoT-based system 100 for assisting users around a swimming pool.

'IoT' here refers to the Internet of things, which is an interconnection of various computing devices via the internet in everyday objects. This interconnection enables connected devices to send and receive data from each other.

The system 100 comprises a plurality of sensors 102-1, 102-2, . . . , **102-*n*, a control unit 104, and at least one actuating mechanism 108**.

An example of IoT in the present invention is the interconnection between the plurality of sensors 102-1 . . . **102-*n*, the control unit 104, and actuating unit 108**.

System 100 is not limited to only components 102-1 . . . **102-*n*, 104, and 108 as communication between 102-1 . . . 102-*n* and 104 is provided by means of a communication network 106. Network connectivity can be wired or wireless between 102-1 . . . 102-*n*, 104, and 108**.

However, wireless connectivity is preferable for the convenience of the user. Examples of wireless connectivity between 102-1 . . . **102-*n*, 104, and 108** can be selected from Bluetooth, infrared and other types that support devices in proximity to connect.

In an embodiment, the communication network 106 may include, but is not limited to, a direct interconnection, an e-commerce network, a Peer-to-Peer (P2P) network, Local Area Network (LAN), Wide Area Network (WAN), wireless network (for example, using Wireless Application Protocol), Internet, Wi-Fi and the like.

The plurality of sensors 102-1, 102-2, . . . , **102-*n* is distributed in a pre-defined area around the swimming pool. The plurality of sensors 102-1, 102-2, . . . , 102-*n*** is configured to sense a plurality of parameters corresponding to various pre-defined events associated with the swimming pool.

In an embodiment, the plurality of parameters includes the level of water relative to the base of the swimming pool, presence of user below the level of water, a position and a height of a person relative to the swimming pool, time a user remains below water, the temperature of the water and a combination thereof.

In an exemplary embodiment, in an event of drowning the sensors 102 monitors and send the following data to the control unit 104: level of water compared to the height of the user and time spent below a pre-determined level of water by the user.

The control unit 104 is communicatively coupled to the plurality of sensors 102-1, 102-2, . . . , **102-*n* through a communication network 106** to receive the plurality of parameters.

The control unit 104 is configured to process the plurality of parameters to generate signals associated with the pre-defined events corresponding to the plurality of parameters.

In an embodiment, the pre-defined events are stored in the memory 114 of the control unit 104. Examples of pre-defined events are drowning of the user, lack of oxygen, physical injury to the user, etc.

The IoT-based actuating mechanism 108 is configured to receive the signals and perform at least one action upon reception of the signals.

The actuating mechanism 108 is an IoT-based mechanism where several devices are interconnected and can be invoked by the generated signals of the control unit 104. For example, a cell phone, lifting mechanism, water dispenser, oxygen mask dispenser, ring buoy release, etc.

In a preferred embodiment, at least one IoT based actuating mechanism 108 in case of the said flagged event is configured to determine the location of the user, deliver a ring buoy to the user, deliver an oxygen mask to the user experiencing breathing issues, uplifting a lower surface of the swimming pool, and transmitting a message to an expert.

In an embodiment, the control unit 104 includes a processor 110. The processor 110 comprises a receiving module 202 configured to receive the plurality of parameters from the plurality of sensors 102-1, 102-2, . . . , **102-*n***.

In another embodiment, the processor 110 includes an analysis module 204 configured to analyze the plurality of parameters by employing a machine learning technique to generate signals associated with the pre-defined events.

The processor 110 is configured to generate a plurality of models based on collected data from various web sources and other databases and repositories. The model is related to pre-defined events.

The model is generated based on the pattern observed during any pre-defined event.

The pattern can be of a sequence of events that is followed by any system in case of drowning or any other emergency. Therefore, advantages and disadvantages can be inferred from the observed pattern.

In yet another embodiment, the machine learning techniques are selected from the group consisting of predictive analysis techniques and time series analysis techniques.

In still another embodiment, the machine learning algorithms employed include, but are not limited to, Naïve Bayes, decision trees, linear regression, neural networks, random forest, and the like.

The processor 110 further includes a flagging module 206 configured to flag an emergency event based on a comparison of the analysed signals with a pre-defined threshold.

In a preferred embodiment, the flagging module 206 is configured to detect a drowning event based on a comparison of the detected height of the user to the water level of the swimming pool and on a time track of the user below a pre-defined water level.

The processor 110 further includes an alarm generating module 208 configured to receive the flagged event and further configured to generate an alarm in case the analysed data falls below a pre-defined threshold.

In a preferred embodiment, at least one IoT-based actuating mechanism 108 includes a lifting mechanism configured to lift up and down a base of the said swimming pool by a rack and pinion mechanism.

In another preferred embodiment, the base is comprised of a fiberglass mesh.

In an embodiment, the alarm generating module 208 is configured to transmit a distress message to local police and ambulance.

The control unit 104 is implemented by the processor 110 that may be a general-purpose processor, a digital signal processor, an application-specific integrated circuit, a field-programmable gate array or another programmable logic device, a discrete gate or transistor logic device, or a discrete hardware component, and can implement or perform the methods, steps, and logical block diagrams disclosed in the embodiments of this invention.

The general-purpose processor may be a microprocessor or any conventional processor or the like. The steps of the method disclosed with reference to the embodiments of this application may be directly performed by a hardware processor or may be performed by using a combination of hardware in the processor and a software unit.

The control unit 104 further includes an I/O interface 112, a memory 114, and the processor 110. The I/O interface 112 may be configured to receive data from the plurality of sensors 102

The data from the I/O interface 112 may be stored in memory 114. The memory 114 may be communicatively coupled to the processor 110 that executes all the modules.

The memory 114 may also store processor instructions which may cause the processor 110 to execute the instructions for managing continuous execution of the modules.

The system of the present invention also has thermal and other appropriate sensors to detect humans in the pool. If anyone is detected underwater for more than a pre-defined time, the rack-and-pinion system activates automatically, lifting the entire mesh floor of the swimming pool above water, thus bringing anyone drowning in the pool out of water.

Figure 3:
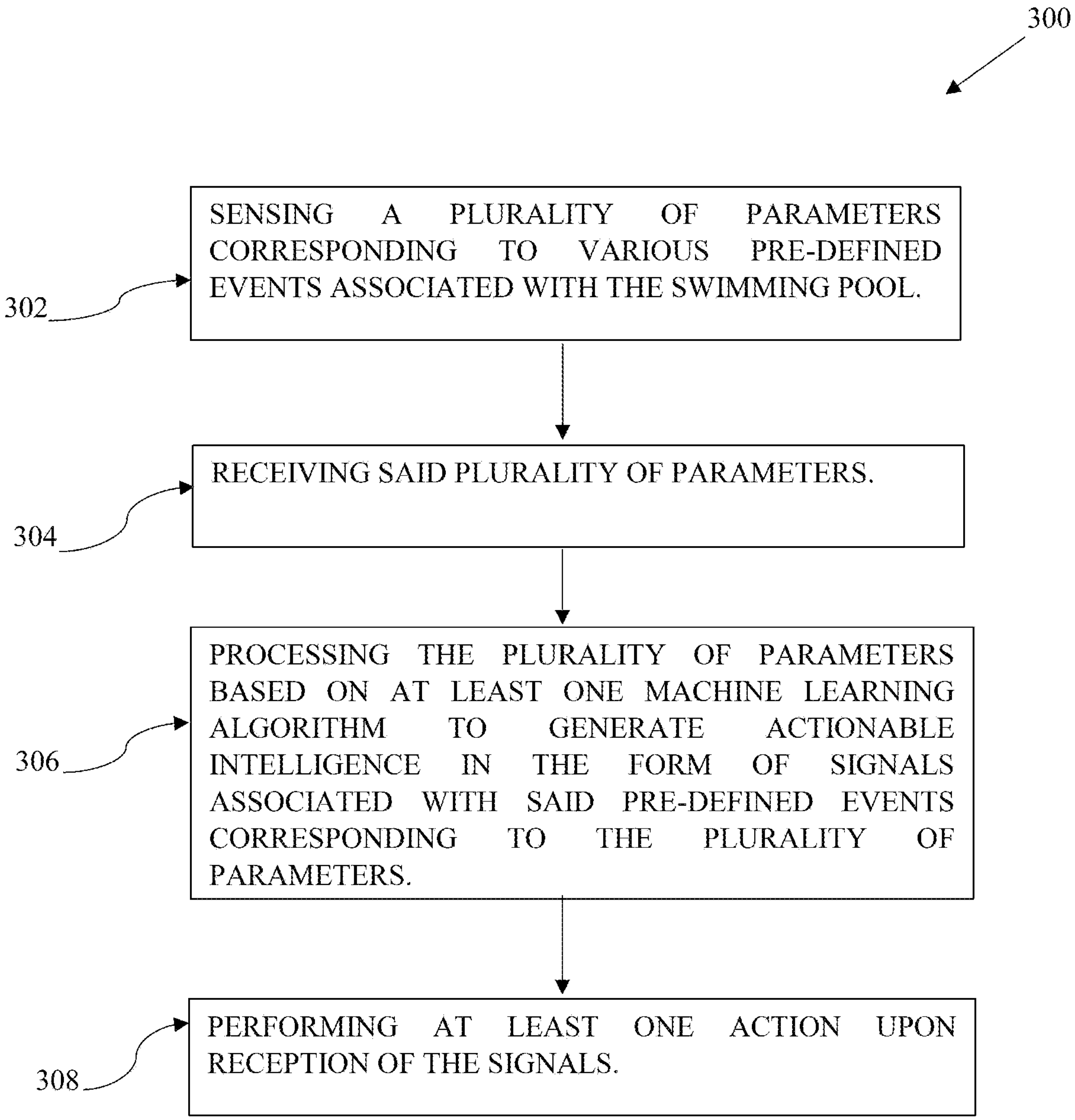
FIG. 3 illustrates an exemplary method flow diagram for assisting users around a swimming pool, in accordance with an embodiment of the present disclosure.

FIG. 3 will now be described that illustrates a method flow diagram for assisting users around a swimming pool, in accordance with an embodiment of the present disclosure.

The present invention envisages a method 300 for assisting users around a swimming pool. The management method 300 comprises sensing at step 302, by a plurality of sensors 102-1, 102-2, . . . , **102-*n***, a plurality of parameters corresponding to various pre-defined events associated with the swimming pool.

Method 300 includes receiving the plurality of parameters at step 304 and processing 306, by a control unit, the plurality of parameters based on at least one machine-learning algorithm to generate actionable intelligence in the form of signals associated with said pre-defined events corresponding to the plurality of parameters.

The method still further includes performing 308, by at least one IoT-based actuating mechanism, at least one action upon reception of the signals.

In an embodiment, the processing 306 further includes steps of:

receiving, by a receiving module 202, the plurality of parameters from the plurality of sensors;

analysing, by an analysis module 204, the plurality of parameters by employing at least one machine learning technique to generate actionable intelligence in the form of signals associated with the pre-defined events;

flagging, by a flagging module 206, an emergency event based on a comparison of the analysed signals with a pre-defined threshold; and generating, by an alarm generating module 208, an alarm corresponding to the flagged event in case the analysed data falls below a pre-defined threshold.

The present invention develops a system that detects if a user is underwater for a longer period of time and drowning. One the artificial intelligence system comprising of underwater thermal sensor detects a person is drowning, it locates the person's position in the swimming pool and rescue systems like a life jacket, rope, etc. reaches that person using an under-water propeller.

According to the system and method disclosed herein, a system and method in accordance with the present invention provide numerous benefits. It provides a useful, novel, and non-trivial solution to the problem of drowning around a swimming pool.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The foregoing description of the embodiments has been provided for purposes of illustration and not intended to limit the scope of the present disclosure. Individual components of a particular embodiment are generally not limited to that particular embodiment but are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of a system and a method for assisting users around the swimming pool that:

- assists users in all emergency situations including drowning around a swimming pool;
- is reliable means for protecting user;
- is inexpensive;
- is accurate;
- is capable of defining various emergency activities;
- is easy to use;
- is the Internet of things based.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The use of the expression "at least" or "at least one" suggests the use of one or more elements or ingredients or quantities, as the use may be in the embodiment of the disclosure to achieve one or more of the desired objects or results.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Therefore, while the embodiments herein have been described in terms of preferred embodiments, those skilled in the art will recognize that the embodiments herein can be practiced with modification within the spirit and scope of the embodiments as described herein.

To the preferred embodiments of this invention, a skilled person, to satisfy contingent requirements, may make modifications, adaptations, and replacements of elements with others functionally equivalent, without departing from the scope of the following claims. Each of the characteristics described as belonging to a possible preferred embodiment can be achieved independently from the other preferred embodiments described.

What is claimed is:

1. A management system (100) for assisting users around a swimming pool, said management system (100) comprising:

- a plurality of sensors (102-1, 102-2, . . . , **102-*n*), distributed in a pre-defined area around said swimming pool, wherein each sensor of the plurality of sensors (102-1, 102-2, . . . , 102-*n***) is configured to sense a plurality of parameters corresponding to various pre-defined events associated with said swimming pool;
- a control unit (104) communicatively coupled to said plurality of sensors (102-1, 102-2, . . . , **102-*n*) through a communication network (106) to receive said plurality of parameters, wherein the control unit (104**) is configured to process said plurality of parameters based on at least one machine learning algorithm to generate actionable intelligence in the form of signals associated with said pre-defined events corresponding to said plurality of parameters; and
- at least one Internet of Things (IOT) based actuating mechanism (108) configured to receive said signals and perform at least one action upon reception of said signals, wherein said at least one IOT based actuating mechanism (108) includes a lifting mechanism configured to lift up and down a base of said swimming pool by a rack and pinion mechanism.

2. The management system (100) as claimed in claim 1, wherein said control unit (104) includes:

- a receiving module (202) configured to receive said plurality of parameters from said plurality of sensors (102-1, 102-2, . . . , **102-*n***);
- an analysis module (204) configured to analyze said plurality of parameters by employing at least one machine learning technique to generate signals associated with said pre-defined events;
- a flagging module (206) configured to flag an emergency event based on a comparison of said analyzed signals with a pre-defined threshold; and
- an alarm generating module (208) configured to receive said flagged event and further configured to generate an alarm in case said analyzed data falls below a pre-defined threshold.

3. The management system (100) as claimed in claim 2, wherein said flagging module (206) is further configured to detect a drowning event based on comparison of said detected height of said user to said water level of said swimming pool and on a time track of said user below a pre-defined water level.

4. The management system (100) as claimed in claim 2, wherein said alarm generating module (208) is further configured to transmit a distress message to local police and ambulance.

5. The management system (100) as claimed in claim 1, wherein said plurality of parameters includes level of water relative to base of said swimming pool, presence of user below said level of water, a position and a height of a person relative to said swimming pool, time a user remains below water, temperature of water and a combination thereof.

6. The management system (100) as claimed in claim 1, wherein said at least one IOT based actuating mechanism (108) in case of flagged event is configured to determine a location of said user, deliver a ring buoy to said user, deliver an oxygen mask to said user experiencing breathing issues, uplifting a lower surface of said swimming pool, and transmitting a message to an expert.

7. The management system (100) as claimed in claim 1, wherein said base is comprised of a fiber-glass mesh.

8. A management method (300) for assisting users around a swimming pool, said management method (300) comprising:

- sensing (302), by a plurality of sensors (102-1, 102-2, . . . , **102-*n***), a plurality of parameters corresponding to various pre-defined events associated with said swimming pool;
- receiving (304), by a control unit (104), said plurality of parameters;
- processing (306), by the control unit (104), said plurality of parameters based on at least one machine learning algorithm to generate actionable intelligence in the form of signals associated with said pre-defined events corresponding to said plurality of parameters; and
- performing (308), by at least one IOT based actuating mechanism (108), at least one action upon reception of said signals, wherein said at least one IOT based actuating mechanism (108) includes a lifting mechanism configured to lift up and down a base of said swimming pool by a rack and pinion mechanism.

9. The management method (300) as claimed in claim 8, wherein said processing (306) further includes:

- receiving, by a receiving module (202), said plurality of parameters from said plurality of sensors;
- analyzing, by an analysis module (204), said plurality of parameters by employing at least one machine learning technique to generate signals associated with said pre-defined events;
- flagging, by a flagging module (206), an emergency event based on a comparison of said analyzed signals with a pre-defined threshold; and
- generating, by an alarm generating module (208), an alarm corresponding to said flagged event in the case said analyzed data falls below a pre-defined threshold.

* * * * *